(12) United States Patent
Muramatsu

(10) Patent No.: US 8,385,597 B2
(45) Date of Patent: *Feb. 26, 2013

(54) TRACKING DEVICE AND IMAGE-CAPTURING APPARATUS

(75) Inventor: Keiko Muramatsu, Tachikawa (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,362

(22) Filed: Jun. 3, 2011

(65) Prior Publication Data

US 2011/0234885 A1    Sep. 29, 2011

Related U.S. Application Data

(63) Continuation of application No. 11/866,740, filed on Oct. 3, 2007, now Pat. No. 7,978,879.

(30) Foreign Application Priority Data

Oct. 3, 2006 (JP) ................................ 2006-271614

(51) Int. Cl.
*G06K 9/00* (2006.01)
*H04N 7/18* (2006.01)

(52) U.S. Cl. ......................... 382/103; 382/291; 348/135

(58) Field of Classification Search .................. 382/100, 382/103, 106, 107, 105, 168, 170, 181, 189–199, 382/209, 219, 232, 254, 255, 274, 275, 276, 382/312, 321, 291; 348/135, 143, 144, 169, 348/353, 345, 154, 208.15

See application file for complete search history.

(56) References Cited

U.S. PATENT DOCUMENTS

| | | | | |
|---|---|---|---|---|
| 5,369,435 A | * | 11/1994 | Ueda | 348/353 |
| 6,072,525 A | | 6/2000 | Kaneda | |
| 6,359,647 B1 | * | 3/2002 | Sengupta et al. | 348/154 |
| 6,456,320 B2 | * | 9/2002 | Kuwano et al. | 348/143 |
| 6,661,450 B2 | | 12/2003 | Yata | |
| 7,031,496 B2 | * | 4/2006 | Shimano et al. | 382/104 |
| 2003/0090751 A1 | | 5/2003 | Itokawa et al. | |

(Continued)

FOREIGN PATENT DOCUMENTS

EP    1560425    8/2005
JP    02-201335    8/1990

(Continued)

OTHER PUBLICATIONS

European Office Action for corresponding EP Application No. 07 019 333.9-2218, Feb. 8, 2012.

(Continued)

*Primary Examiner* — Seyed Azarian
(74) *Attorney, Agent, or Firm* — Ditthavong Mori & Steiner, P.C.

(57) ABSTRACT

A tracking device includes: an image sensor that obtains image information of an image present within an image plane formed via an optical system; a tracking unit that tracks a target within the image plane based upon the image information; a focus detection unit that detects a focus adjustment state of the optical system over at least one focus detection area set in the image plane; a focus adjustment unit that executes focus adjustment for the optical system based upon the focus adjustment state detected in the focus detection area corresponding to a position of the target; a decision-making unit that makes a decision as to whether or not the target is being tracked based upon results of tracking operation executed by the tracking unit; and a control unit that bans the focus adjustment based upon results of the decision made by the decision-making unit.

32 Claims, 13 Drawing Sheets

U.S. PATENT DOCUMENTS

| | | |
|---|---|---|
| 2004/0004670 A1 | 1/2004 | Yamashita |
| 2004/0017502 A1* | 1/2004 | Alderson ..................... 348/345 |
| 2005/0264679 A1 | 12/2005 | Sasaki et al. |
| 2006/0193495 A1* | 8/2006 | Kurokawa ..................... 382/107 |

FOREIGN PATENT DOCUMENTS

| | | |
|---|---|---|
| JP | 06-242486 | 9/1994 |
| JP | 07-110429 | 4/1995 |
| JP | H07-191256 | 7/1995 |
| JP | 08-009227 | 1/1996 |
| JP | 08-094729 | 4/1996 |
| JP | H08-237536 | 9/1996 |
| JP | 11-326743 | 11/1999 |
| JP | 2005-055744 | 3/2005 |
| JP | 2006-058431 | 3/2006 |

OTHER PUBLICATIONS

Japanese Office Action for corresponding JP Application No. 2007-258937, Dec. 27, 2011.

Japanese Office Action for corresponding JP application No. 2007-258937, Jun. 26, 2012.

Japanese Notice of Decision to Grant a Patent for corresponding JP Application No. 2007-258937, Nov. 27, 2012.

* cited by examiner 47  49

47
49

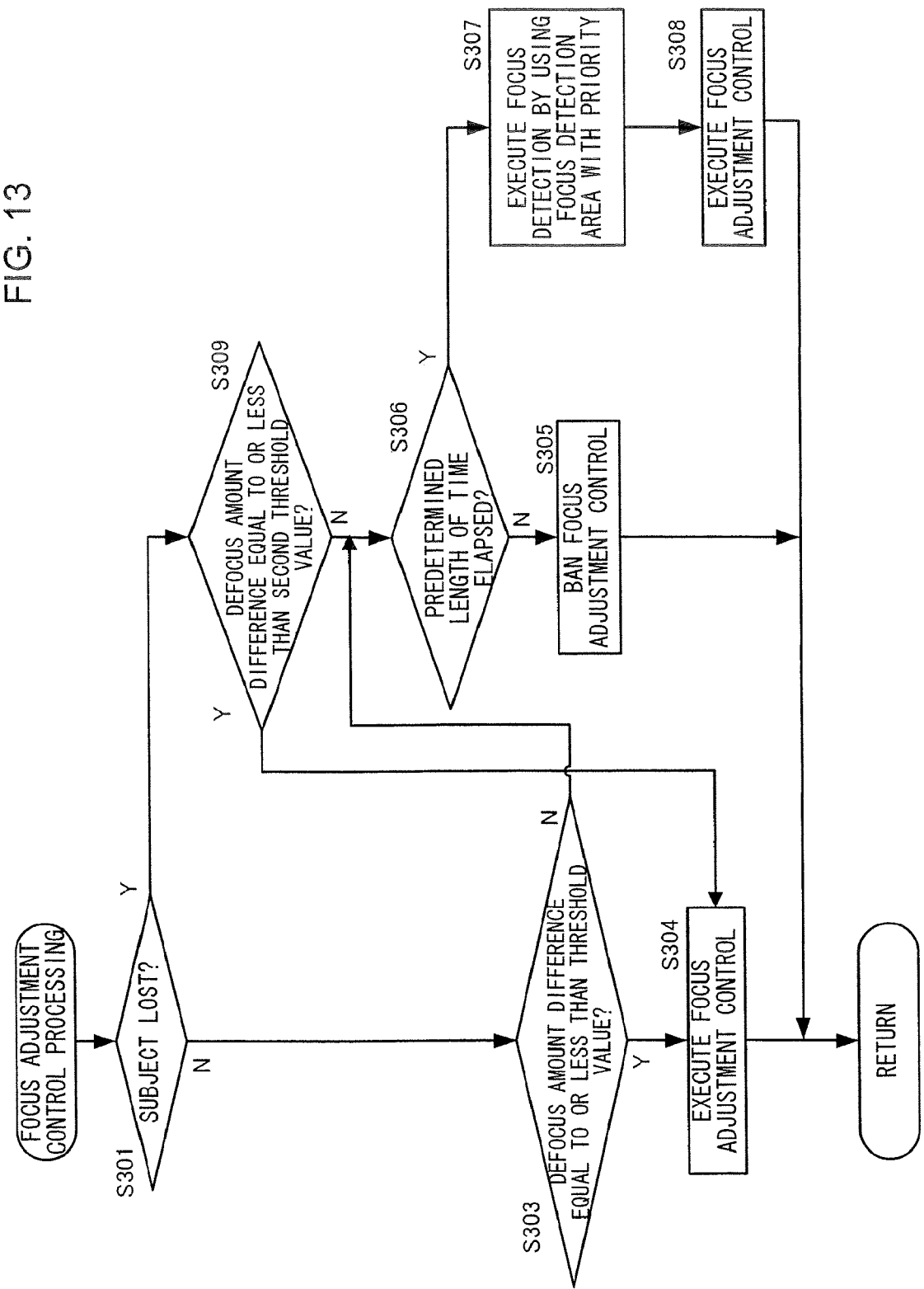

US 8,385,597 B2

TRACKING DEVICE AND IMAGE-CAPTURING APPARATUS

INCORPORATION BY REFERENCE

The disclosure of the following priority application is herein incorporated by reference:
Japanese Patent Application No. 2006-271614 filed Oct. 3, 2006

BACKGROUND OF THE INVENTION

1. Field of the Invention

The present invention relates to a tracking device and an image-capturing apparatus.

2. Description of Related Art

There is a tracking device known in the related art that tracks a main subject by designating an image contained in an area specified by the photographer in a photographed image as a template image, searching for an image area matching the template in a subsequent captured image through pattern matching, and setting the area matching the template image as a main subject area containing a subject which the photographer considers to be a main subject (see Japanese Laid Open Patent Publication No. 2006-658431).

SUMMARY OF THE INVENTION

However, there is an issue yet to be addressed in the tracking device in the related art described above, which tracks the subject through pattern matching by using the template image, in that if another object moves across the space in front of the tracking target subject, it may lose track of the tracking target subject or erroneously recognize another subject as the tracking target.

According to the 1st aspect of the present invention a tracking device, comprises: an image sensor that obtains image information of an image present within an image plane formed via an optical system; a tracking unit that tracks a target within the image plane based upon the image information; a focus detection unit that detects a focus adjustment state of the optical system over at least one focus detection area set in the image plane; a focus adjustment unit that executes focus adjustment for the optical system based upon the focus adjustment state detected in the focus detection area corresponding to a position of the target; a decision-making unit that makes a decision as to whether or not the target is being tracked based upon results of tracking operation executed by the tracking unit; and a control unit that bans the focus adjustment based upon results of the decision made by the decision-making unit.

According to the 2nd aspect of the present invention, in the tracking device according to the 1st aspect, it is preferred that: a plurality of focus detection areas are set in the image plane; and the tracking unit calculates a difference quantity indicating a difference between image information in the image plane and image information corresponding to the target and tracks the target based upon the difference quantity.

According to the 3rd aspect of the present invention, in the tracking device according to the 1st aspect, it is preferred that: a plurality of focus detection areas are set in the image plane; and the tracking unit calculates a difference quantity indicating a difference between image information in the image plane and image information corresponding to the target and tracks the target by designating an area indicating the smallest difference quantity as an area where the target is located.

According to the 4th aspect of the present invention, in the tracking device according to the 1st aspect, it is preferred that: the tracking unit compares image information in the image plane with image information corresponding to the target; and the decision-making unit makes a decision as to whether or not the target is being tracked based upon comparison results.

According to the 5th aspect of the present invention, in the tracking device according to the 1st aspect, it is preferred that: the tracking unit compares image information in the image plane with image information corresponding to the target; and the decision-making unit makes a decision as to whether or not the target is being tracked based upon a match rate at which the image information in the image plane and the image information corresponding to the target match.

According to the 6th aspect of the present invention, in the tracking device according to the 1st aspect, it is preferred that the control unit bans the focus adjustment if the decision-making unit determines that the target is not being tracked.

According to the 7th aspect of the present invention, in the tracking device according to the 1st aspect, it is preferred that the decision-making unit makes a decision as to whether or not to ban the focus adjustment based upon comparison results obtained by comparing image information in the image plane with image information corresponding to the target and the focus adjustment state detected in the focus detection area corresponding to a position of the target.

According to the 8th aspect of the present invention, in the tracking device according to the 1st aspect, it is preferred that if the target is judged to have been tracked after banning the focus adjustment, the control unit rescinds a ban of the focus adjustment.

According to the 9th aspect of the present invention, in the tracking device according to the 1st aspect, it is preferred that: if the target is judged to have been tracked after banning the focus adjustment, the control unit executes focus adjustment for the optical system based upon the focus adjustment state detected in the focus detection area corresponding to a position of the target after banning the focus adjustment.

According to the 10th aspect of the present invention, in the tracking device according to the 1st aspect, it is preferred that if the target cannot be tracked continuously over a predetermined length of time after banning the focus adjustment, the control unit rescinds a ban of the focus adjustment.

According to the 11th aspect of the present invention, in the tracking device according to the 1st aspect, it is preferred that if a ban of the focus adjustment is rescinded after banning the focus adjustment, the focus adjustment unit executes focus adjustment for the optical system based upon the focus adjustment state detected in the focus detection area corresponding to a position of the target before the ban of the focus adjustment was started.

According to the 12th aspect of the present invention, in the tracking device according to the 1st aspect, it is preferred that: the tracking unit tracks the target inside a search area set within the image plane; and the search area can be altered based upon results of the decision made by the decision-making unit.

According to the 13th aspect of the present invention, in the tracking device according to the 1st aspect, it is preferred that: the tracking unit tracks the target in a search area set within the image plane; and if a position of the target is outside the search area, the tracking unit tracks the target by expanding the search area.

According to the 14th aspect of the present invention, in the tracking device according to the 1st aspect, it is preferred that: the tracking unit tracks the target inside a search area set within the image plane; and if a position of the target is outside the search area, a direction along which the subject is likely to move within the image plane is estimated and the search area is changed by the estimated moving direction.

According to the 15th aspect of the present invention, in the tracking device according to the 1st aspect, it is preferred that the image information indicates color or brightness of the target.

According to the 16th aspect of the present invention, an image-capturing apparatus comprises a tracking device according to the 1st aspect.

According to the 17th aspect of the present invention, in the image-capturing apparatus according to the 16th aspect, it is preferred that the image sensor includes a first image sensor used to obtain image information and record the image within the image plane and a second image sensor that obtains image information used by the tracking unit when tracking the target.

According to the 18th aspect of the present invention a tracking method comprises: obtaining image information of an image within an image plane formed via an optical system; tracking a target within the image plane based upon the image information; detecting a focus adjustment state of the optical system in correspondence to at least one focus adjustment area set within the image plane; executing focus adjustment for the optical system based upon the focus adjustment state detected in the focus detection area corresponding to a position of the target; making a decision as to whether or not the target is being tracked; and banning the focus adjustment based upon results of the decision.

According to the 19th aspect of the present invention, in the tracking method according to the 18th aspect, it is preferred that: the method further comprises comparing image information in the image plane with image information corresponding to the target; and the decision as to whether or not the target is being tracked is made based upon comparison results.

According to the 20th aspect of the present invention, in the tracking method according to the 18th aspect, it is preferred that: the method further comprises comparing image information in the image plane and image information corresponding to the target; and the decision as to whether or not the target is being tracked is made based upon a match rate at which the image information in the image plane and the image information corresponding to the target match.

According to the 21st aspect of the present invention, in the tracking method according to the 18, it is preferred that: the method further comprises making a decision as to whether or not to ban the focus adjustment based upon comparison results obtained by comparing image information in the image plane and image information corresponding to the target and the focus adjustment state detected in the focus detection area corresponding to a position of the target.

BRIEF DESCRIPTION OF THE DRAWINGS

FIG. 13 presents a flowchart of a variation of the focus adjustment control shown in FIG. 10.

DESCRIPTION OF PREFERRED EMBODIMENT

Figure 1:
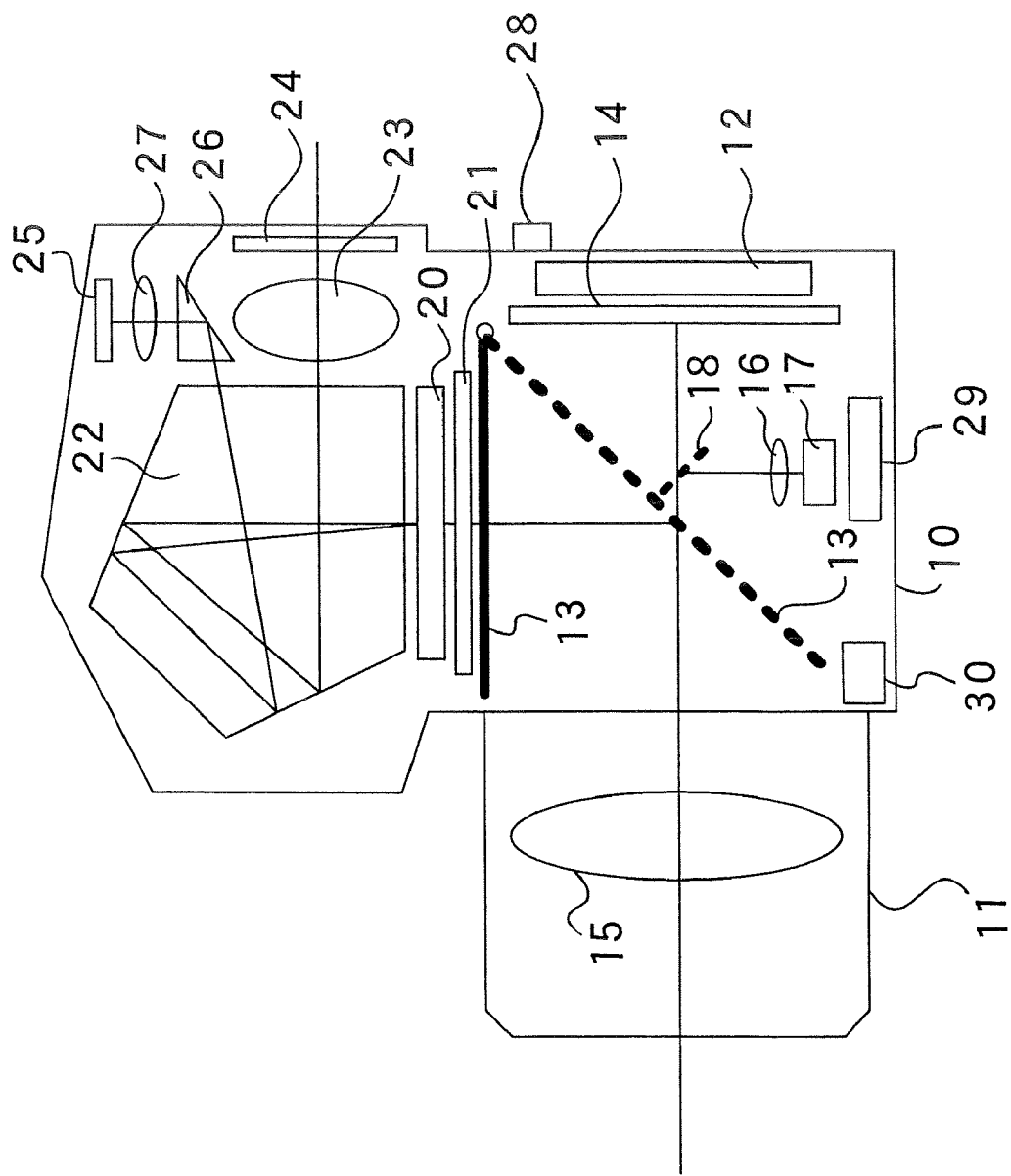
FIG. 1 shows the structure adopted in the camera (image-capturing apparatus) achieved in an embodiment.

FIG. 1 shows the structure of an image-capturing apparatus (a single lens reflex digital still camera) equipped with the subject tracking device achieved in an embodiment. An exchangeable lens 11 is exchangeably mounted at a camera body 10. A first image sensor 12 that captures a subject image for purposes of image recording is disposed at the camera body 10. The first image sensor 12 may be constituted with a CCD, a CMOS or the like. When photographing an image, a quick return mirror 13 retreats to a position outside the photographic light path indicated by the solid line and a shutter 14 is released so as to allow the subject image to be formed at the light receiving surface of the first image sensor 12 via a photographic lens 15.

A focus detection optical system 16 and a range-finding element 17 used to detect the focus adjustment state of the photographic lens 15 are disposed at the bottom of the camera body 10. In the embodiment, the focus detection is executed by adopting a split-pupil phase difference detection method. The focus detection optical system 16 guides a pair of focus detection light fluxes having passed through the photographic lens 15 to the light receiving surface of the range-finding element 17 where a pair of optical images are formed. The range-finding element 17, which may include, for instance, a pair of CCD line sensors, outputs a focus detection signal corresponding to the pair of optical images. Prior to the photographing operation, the quick return mirror 13 is set at a position within the photographic light path as indicated by the dotted line. Thus, the focus detection light fluxes departing the photographic lens 15 are transmitted through the half mirror portion of the quick return mirror 13, are reflected at a sub-mirror 18 and are then guided to the focus detection optical system 16 and the range-finding element 17.

A viewfinder optical system is disposed in the space in the camera body 10 on the top side. Before the photographing operation, the quick return mirror 13 assumes the position indicated by the dotted line and the subject light from the photographic lens 15 is guided to a focusing screen 20 to form the subject image on the focusing screen 20. At a liquid crystal display element 21, the subject image formed on the focusing screen 20 is displayed with various types of information such as the focus detection position and the exposure value superimposed thereupon. The subject image on the focusing screen 20 is guided to an eyepiece window 24 via a roof pentaprism 22 and an eyepiece lens 23 to allow the photographer to visually check the subject image.

In addition, a second image sensor 25 which captures the subject image for purposes of subject tracking and photometering is disposed at the viewfinder optical system present on the top side of the camera body. The second image sensor 25 is to be described in detail later. The subject image formed on the focusing screen 20 is re-formed at the image receiving surface of the second image sensor 25 via the roof pentaprism 22, a prism 26 and an image forming lens 27. The second image sensor 25 outputs image signals corresponding to the subject image.

An operation member 28, a control device 29, a lens drive device 30 are also disposed in the camera body 10. The operation member 28 includes switches and selectors via which the camera is operated, e.g., a shutter button (a shutter release button) and a focus detection area selector switch. The control device 29, constituted with a CPU and its peripheral components, executes various types of control on the camera, arithmetic operations and the like. In addition, the lens drive device 30, constituted with a motor and a drive circuit, executes focus adjustment for the photographic lens 15.

Figure 2:
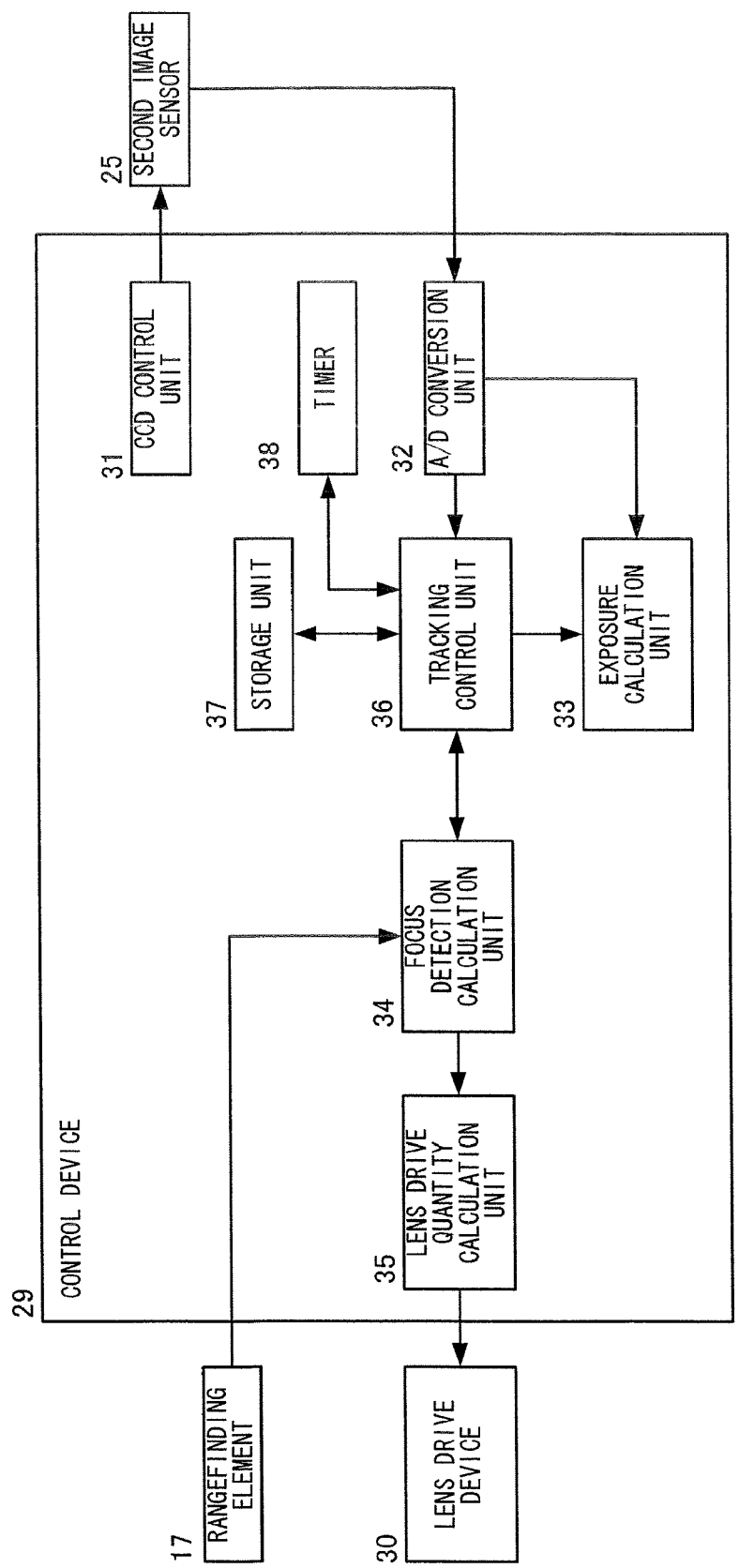
FIG. 2 shows in detail the structure adopted in the control device in the camera in the embodiment.

FIG. 2 shows the structure of the control device 29 in detail. It is to be noted that illustration and explanation of the control functions that do not bear any direct relevance to the present invention are omitted. The control device 29 includes various control units achieved in the software configuration assumed in the CPU. A CCD control unit 31 controls electrical charge storage and read at the second image sensor 25. An A/D conversion unit 32 converts analog image signals output from the second image sensor 25 to digital image signals. An exposure calculation unit 33 calculates an exposure value based upon the image signals constituting the image captured by the second image sensor 25. A timer 38, which has a clock function, is used to measure the elapsing time.

A focus detection calculation unit 34 detects the focus adjustment state of the photographic lens 15, i.e., the defocus amount indicating the extent of defocusing in this embodiment, based upon the focus detection signal corresponding to the pair of optical images, which is output from the range-finding element 17. As explained in detail later, a plurality of focus detection areas are set within the photographic image plane of the photographic lens 15, the range-finding element 17 outputs the focus detection signal obtained based upon the pair of optical images in correspondence to each focus detection area and the focus detection calculation unit 34 detects the defocus amount by using the focus detection signal generated based upon the pair of optical images in correspondence to each focus detection area. A lens drive quantity calculation unit 35 converts the detected defocus amount to a lens drive quantity. The lens drive device 30 executes focus adjustment by driving the focusing lens (not shown) at the photographic lens 15 in correspondence to the lens drive quantity.

A tracking control unit 36 stores an image in a tracking target area, either manually specified by the photographer or automatically set by the camera in the subject image captured by the second image sensor 25, into a storage unit 37 as a template image and also controls the focus detection calculation unit 34 so that the focus detection calculation unit 34 detects the defocus amount pertaining to the photographic lens 15 over the tracking target area. In addition, the tracking control unit searches for an image area matching the template image in a subsequently captured image, detects the defocus amount indicating the extent of defocusing manifested by the photographic lens 15 at a position corresponding to the image area matching the template image, and designates the current image area as a new tracking target area if there is no significant change between the defocus amount detected in the previous tracking target area and the defocus amount detected in the current image area. A specific subject is tracked by repeatedly executing the procedure described above. In the storage unit 37, the current template image used in the tracking operation executed by the tracking control unit 36 and information such as defocus amount information or lens information pertaining to the photographic lens 15 indicating the focal length, the open F value, the aperture value, the conversion coefficient used when converting the image shift quantity to the defocus amount and the like are stored.

Figure 3:
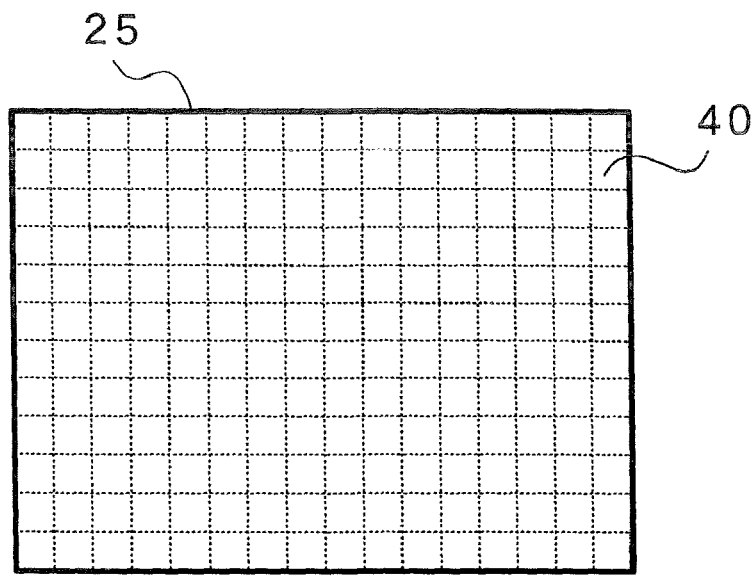
FIG. 3 is a front view of the second image sensor.
Figure 4:
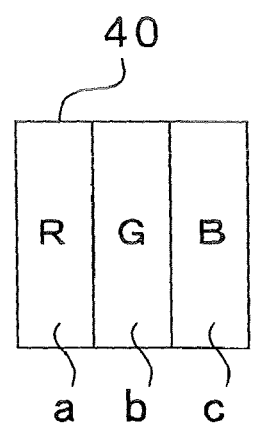
FIG. 4 shows the filters disposed at each pixel in the second image sensor.

FIG. 3 is a front view showing in detail the structure adopted in the second image sensor 25. The second image sensor 25 includes a plurality of pixels (photoelectric conversion elements) 40 (16(across)×12 (down)=192 pixels in this example) arrayed in a matrix pattern. As shown in FIG. 4, the pixels 40 are each divided into three parts 40a, 40b and 40c with primary color filters, a red (R) filter, a green (G) filter and a blue (B) filter disposed at the parts 40a, 40b and 40c respectively. Thus, an R signal, a G signal and a B signal expressing the subject image are output from each pixel 40.

Next, the subject tracking operation executed in the embodiment is explained. FIGS. 5 and 6 illustrate the method adopted in the subject tracking operation in the embodiment, whereas FIGS. 7 through 10 present flowcharts of the subject tracking processing executed in the embodiment. The control device 29 starts the subject tracking processing in response to a halfway press operation of the shutter button at the operation member 28 after the photographer manually specifies a tracking target area in the subject image captured by the second image sensor 25 or the camera automatically sets a tracking target area in the subject image captured by the second image sensor 25.

It is to be noted that except for during a photographing operation executed by pressing the shutter button all the way down, the quick return mirror 13 is set within the photographic light path as indicated by the dotted line in FIG. 1 to allow the subject light entering via the photographic lens 15 to form an image on the focusing screen 20. The subject image formed on the focusing screen 20 is then guided to the second image sensor 25 via the roof pentaprism 22, the prism 26 and the image forming lens 27 and the subject image is repeatedly output from the second image sensor 25.

A plurality of focus detection areas are set on the photographic image plane of the photographic lens 15 and the positions of the individual focus detection areas are indicated at the liquid crystal display element 28 by superimposing area marks over the subject image formed on the focusing screen 20. As shown in FIG. 5, eleven focus detection areas 45a~45k are set in the photographic image plane in the embodiment. As a given area is selected via the focus area selector switch at the operation member 28, the corresponding area mark is highlighted.

As the focus detection area 45f corresponding to the subject image is selected via the focus detection area selector switch at the operation member 28 and the shutter button at the operation member 28 is pressed halfway down in this state, the tracking target subject is specified. In addition, in response to this halfway press operation, the control device 29 starts the subject tracking processing.

Figure 7:
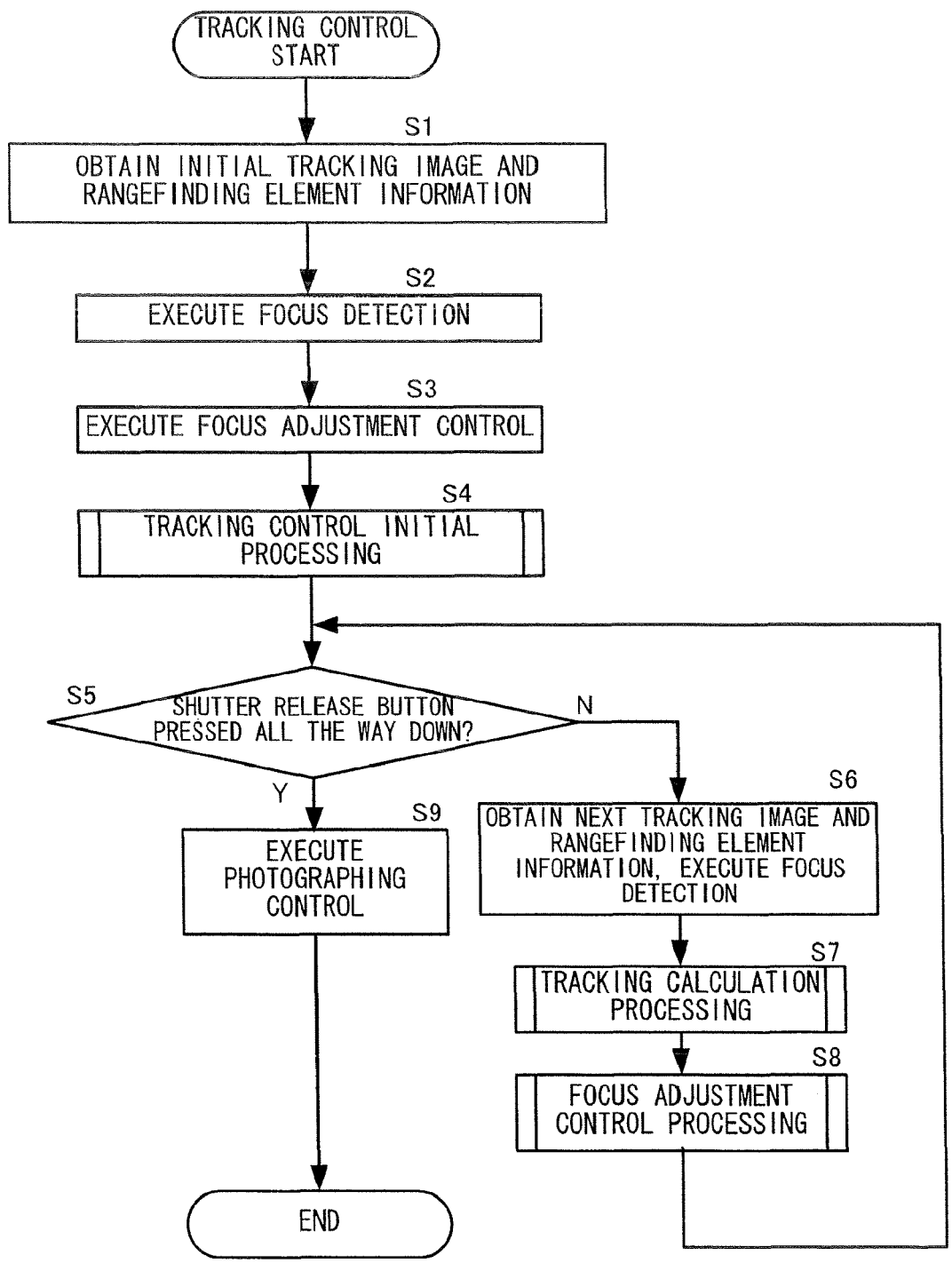
FIG. 7 presents a flowchart of the tracking control executed in the embodiment.

In step 1 in FIG. 7, the initial tracking image (the first image obtained after the start of the subject tracking processing) is obtained via the second image sensor 25 and a pair of optical images corresponding to the selected focus detection area (45f in this example) are obtained via the range-finding element 17. In the following step 2, the defocus amount (the focus adjustment state of the photographic lens 15) indicating the extent of defocusing manifesting in the focus detection area 45f is detected based upon the pair of optical images corresponding to the focus detection area 45f, having been obtained via the range-finding element 17. In step 3, the defocus amount detected in correspondence to the selected focus detection area 45f is converted to a lens drive quantity and the lens drive device 30 drives the photographic lens 15 for focus adjustment.

Figure 5A:
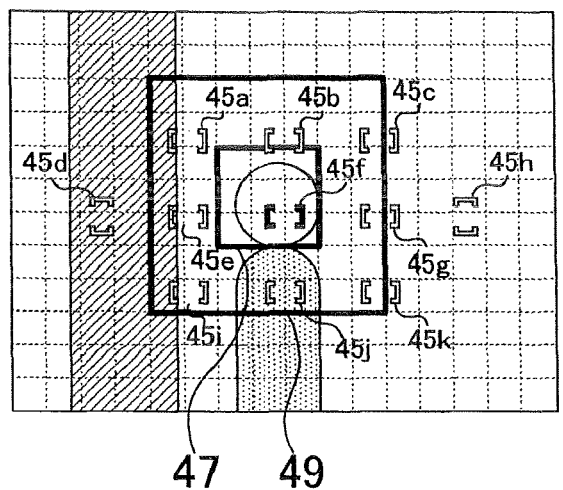
FIGS. 5A and 5B illustrate the subject tracking operation executed in the embodiment.
Figure 5B:
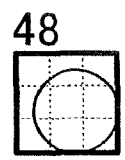
Figure 8:
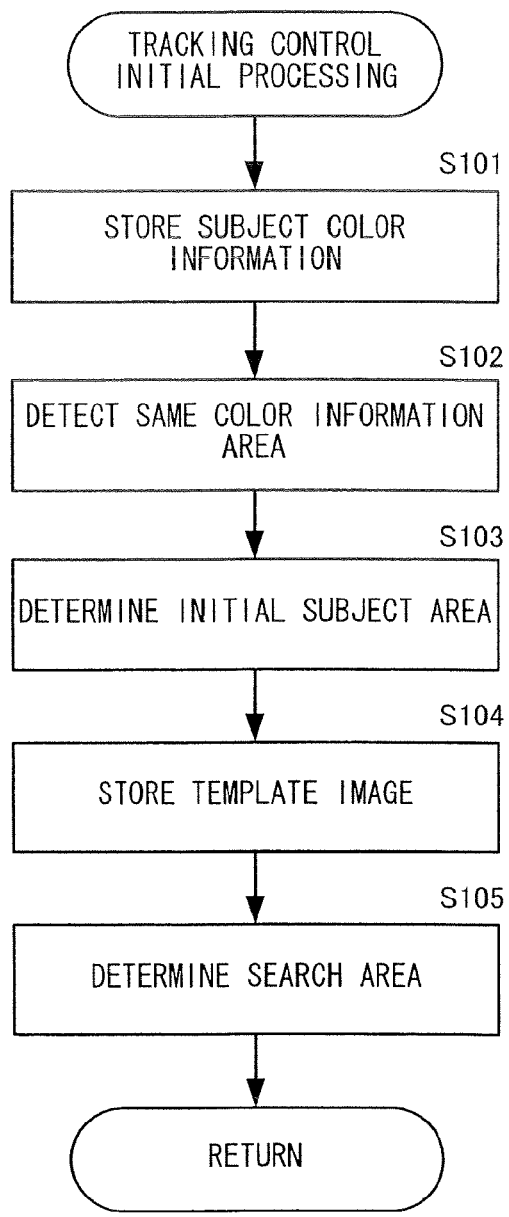
FIG. 8 presents a flowchart of the tracking control initial processing executed in the embodiment.

In step 4, the tracking control initial processing shown in FIG. 8 is executed. In step 101 in FIG. 8, subject color information pertaining to an image area in the initial tracking image, which corresponds to the focus detection area 45f, is stored. In step 102, a same color information area with color information similar to the subject color information, which is present around the focus detection area 45f in the initial tracking image, is detected and in the following step 103, the same color information area thus detected is designated as an initial tracking subject area 47, as shown in FIG. 5A. In step 104, the image in the tracking subject area 47 contained in the initial tracking image is stored into the storage unit 37 as a template image 48 (see FIG. 5B) to be used in the subsequent tracking processing, and in step 105, an area defined by expanding the tracking subject area 47 by a predetermined number of pixels (two pixels in this example) on all sides, i.e., the top side, the bottom side, the left side and the right side, is set as a search area 49.

Once the tracking control initial processing ends, the operation proceeds to step 5 in FIG. 7 to make a decision as to whether or not the shutter button at the operation member 28 has been pressed all the way down, i.e., whether or not a shutter release operation has been performed. If it is decided that the shutter release operation has not been performed, the operation proceeds to step 6 to obtain a next tracking image (see FIG. 6A) from the second image sensor 25, obtain the pair of optical images to be used for focus detection in correspondence to each of the focus detection areas 45a through 45k via the range-finding element 17. And the focus detection calculation unit 34 detects the defocus amount (the defocus adjustment state of the photographic lens 15) for each of the focus detection areas 45a through 45k based on the pair of optical images thereof.

Figure 9:
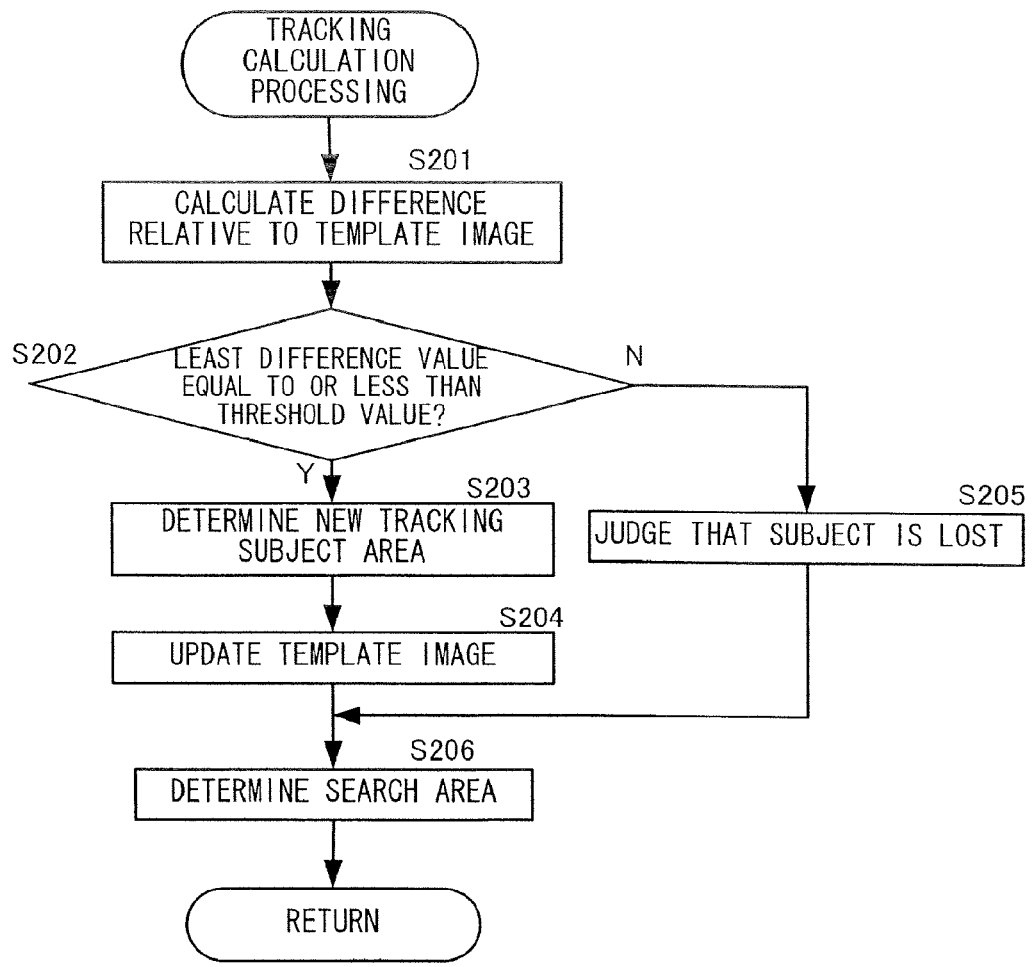
FIG. 9 presents a flowchart of the tracking calculation processing executed in the embodiment.

In step 7, the tracking calculation processing shown in FIG. 9 is executed. In step 201 in FIG. 9, image areas matching the template image area 48 in size, are sequentially sliced out from the search area 49 in the next tracking image (see FIG. 6A), each image area having been sliced out is compared with the template image 48 and the difference between each of the hues B/G and R/G at each pixel in the sliced image and each of the hues B/G and R/G at the corresponding pixel in the template image is determined through arithmetic operation. And then the differences of the each hue of the individual pixels are added up and the sum of the added differences of individual hues is calculated for each of the sliced images. The difference of each of the color hues B/G and R/G at the corresponding pixels can be determined through arithmetic operation executed by using raw image signals output from the second image sensor 25. In other words, since the raw image signals can be used without having to execute any pre-processing such as white balance processing, filter processing or the like, the tracking processing can be simplified. It is to be noted that instead of the hue difference, the difference between the colors at each pixel in the sliced image and the corresponding pixel in the template image may be determined through arithmetic operation. The processing shown in FIG. 9, in which the subject is tracked based upon the hue difference or the color difference, may be referred to as color-based tracking processing.

Once the arithmetic operation executed to calculate the differences between the hues in the search area 49 in the next tracking image and the hues in the template image 48 is completed, the operation proceeds to step 202 to search for an area with the smallest sum of the hue difference (hereafter referred to as the least hue difference) and make a decision as to whether or not the hue difference calculated for the area with the least hue difference is equal to or less than a predetermined threshold value. This threshold value is used as a reference value based upon which a decision is made as to whether or not the subject present in the area with the least hue difference is the tracking target subject and if the hue difference in the area with the least hue difference is equal to or less than the threshold value, the tracking target subject having been specified in the initial tracking image can be assumed to be present within the search area 49.

An optimal value is selected to be used as the threshold value through various types of testing or simulation. It is to be noted that while the threshold value may be a fixed value, the threshold value may dynamically change, instead. For instance, the threshold value may be changed according to the moving amount of the tracking target subject. Also, the threshold value may assume different values in correspondence to various photographing modes. For instance, the threshold value may be changed to a big value in a mode of taking a sport scene in which the moving amount of the tracking target subject moves is supposed to be big. Alternatively, the threshold value may be altered based upon the color image composition in the template image 48, i.e., based upon the R, G and B values. As a further alternative, the threshold value may be adjusted based upon, for instance, the least hue difference history.

When the hue difference between a sliced image and the template image 48 is small, the sliced image can be assumed to largely match the template image 48. If, on the other hand, the hue difference is significant, the match rate at which the sliced image matches the template image 48 is low. Namely, the sliced image and the template image are essentially mismatched. A decision as to whether or not the target is being tracked successfully is thus made based upon the match rate with which the sliced image matches the template image 48.

Figure 6A:
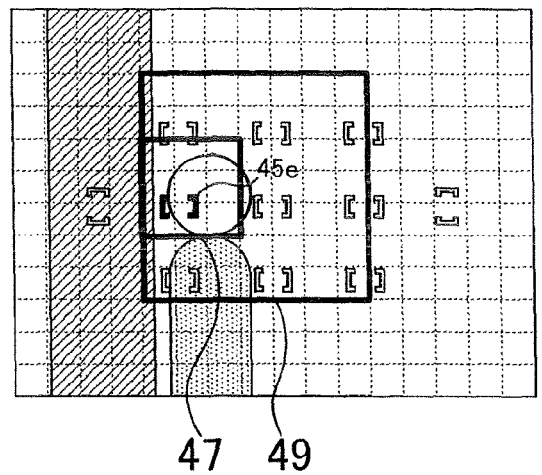
FIGS. 6A and 6B illustrate the subject tracking operation executed in the embodiment.

If the least hue difference is equal to or less than the threshold value, the operation proceeds to step 203 to designate the area with the least hue difference in the next tracking image as a new tracking subject area 47, as shown in FIG. 6A. In the following step 204, the template image 48 is updated. In the embodiment, a new template image 48 is generated by incorporating the image information corresponding to the new tracking subject area 47 in the image information pertaining to the previous template image 48 such as the color information and the brightness information pertaining to the previous template image 48 at a ratio of, for instance, 20% of the image information for the new tracking subject area 47 to 80% of the image information corresponding to the previous template image. It is to be noted that if the tracking target subject can no longer be detected, the previous template image 48 may be retained as the current template image or the image in the new tracking subject area 47 may be designated as the template image 48. In step 206, an area defined by expanding the new tracking subject area 47 by a predetermined number of pixels (two pixels in this example) on all sides, i.e., the top side, the bottom side, the left side and the right side, is set as a new search area 49.

Figure 6B:
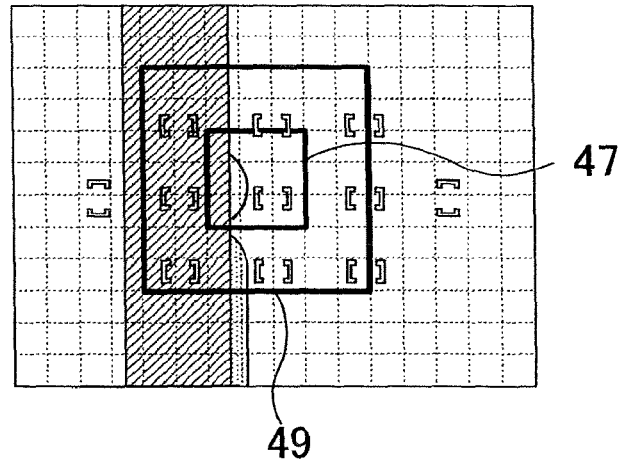

If, on the other hand, it is decided in step 202 that the least hue difference value is greater than the threshold value, the operation proceeds to step 205 to set a "subject lost flag" by judging that the tracking target subject has become lost, e.g., the tracking target subject is hidden behind another subject in the search area 49, as shown in FIG. 6B. If the tracking device has lost track of the tracking target subject, the area expanded by two pixels as described above may be designated or a greater area may be designated as a new search area in step 206. For instance, an area defined by expanding the tracking target subject area 49 by a predetermined number of pixels (3~4 pixels in this example) on all sides, i.e., the top side, the bottom side, the left side and the right side, may be designated as a new search area 49. The likelihood of recapturing the tracking target subject is higher over a greater search area 49.

Figure 11A:
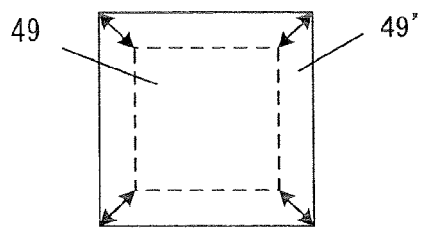
FIGS. 11A through 11D illustrate how the search area 49 is updated to a new search area 49
Figure 11B:
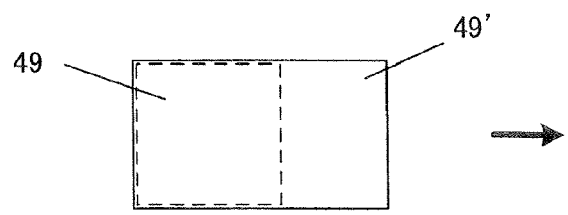
Figure 11C:
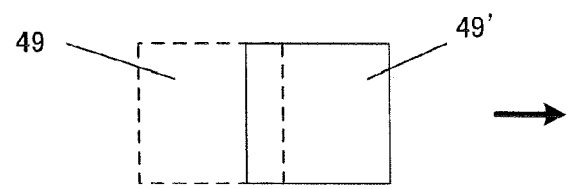
Figure 11D:
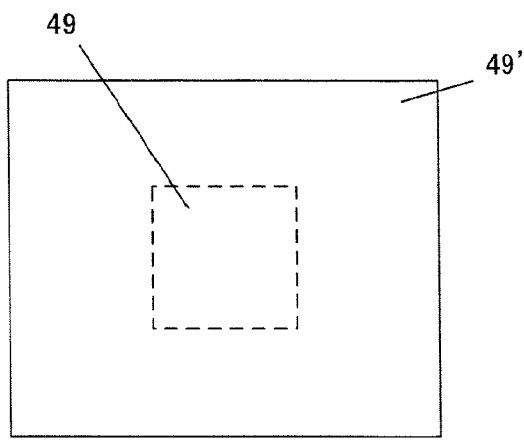

It is to be noted that the search area 49 may be expanded homothetically (through proportionate expansion) as described above (see FIG. 11A), or it may be expanded along a single direction only, i.e., along the tracking target subject moving direction (indicated by the arrow) estimated based upon the tracking history or the like (see FIG. 11B). Alternatively, the search area 49 retaining the current shape and size may be shifted along the estimated tracking target subject moving direction (indicated by the arrow) (see FIG. 11C). As a further alternative, the entire image plane may be designated as the search area 49 (see FIG. 11C). Namely, a new search area 49' can be designated by expanding or shifting the current search area 49, by re-designating the entire image plane as the new search area, or the like. FIGS. 11A~11D each show how the search area 49 may be updated to the new search area 49'.

Figure 10:
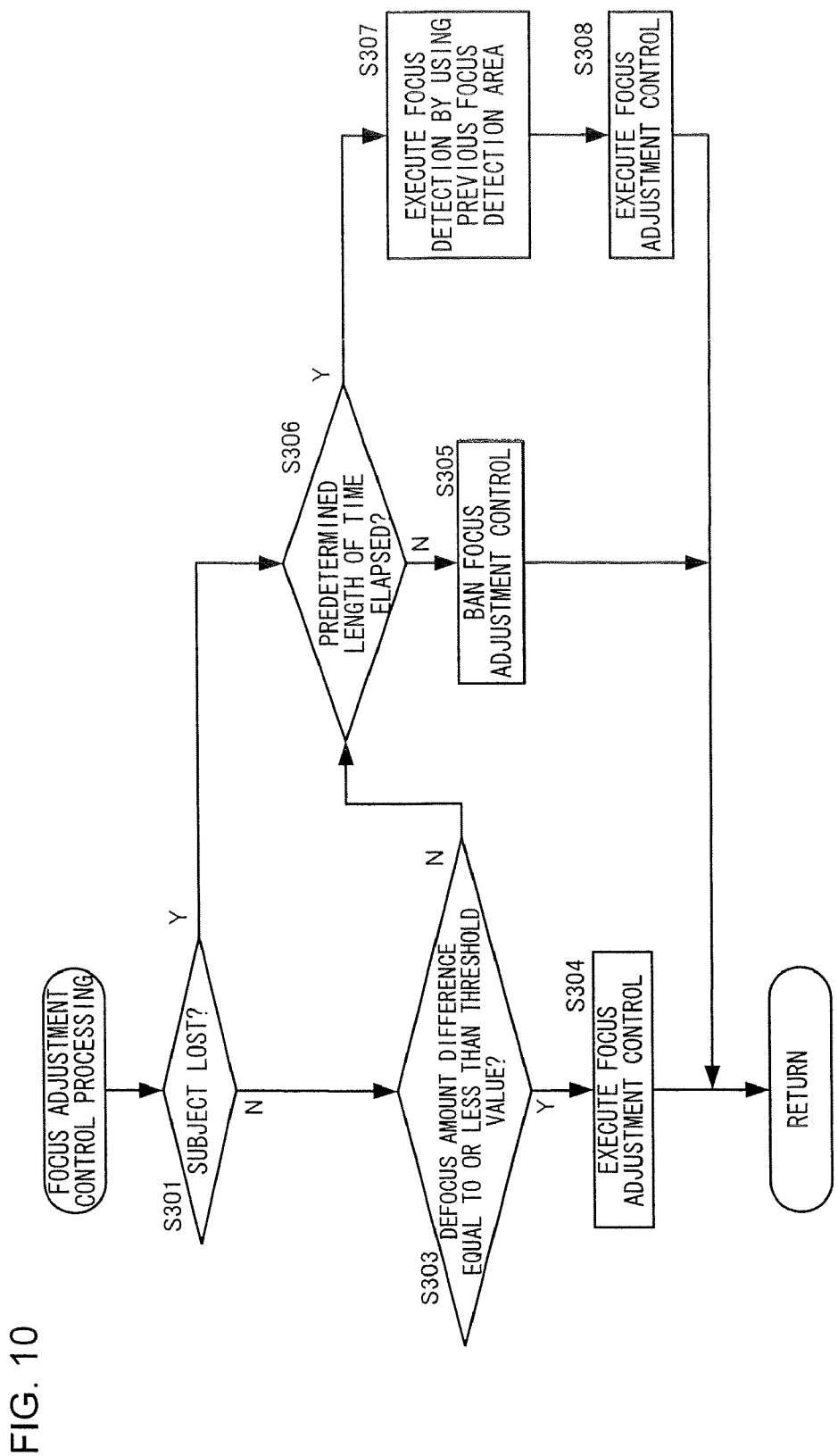
FIG. 10 presents a flowchart of the focus adjustment control executed in the embodiment.

Once the tracking calculation processing shown in FIG. 9 is completed, the operation returns to step 8 in FIG. 7 to execute the focus adjustment control processing shown in FIG. 10. In step 301, a verification is executed to determine whether or not the "subject lost flag" has been set, and if it is decided that the "subject lost flag" has been set, the timer 38 is started up before the operation proceeds to step 306. If the timer 38 has already been started up, the operation simply proceeds to step 306.

If it is decided in step 301 that the tracking device has not lost the tracking target subject, the operation proceeds to step 303. If it has been previously decided in step 301 that the tracking device had lost track of the tracking target subject and the timer 38 had started up accordingly, the timer 38 is stopped and reset at this point. While details of the processing executed in step 303 are to be provided later, if it has been previously judged in step 303 that the difference between the defocus amounts exceeds a threshold value and the timer 38 has been started up accordingly, the timer count is continuously executed. It is to be noted that the fact that the operation proceeds to step 303 after resetting timer 38 means that the tracking target subject is judged to have been detected again following a focus adjustment ban and the focus adjustment ban set after losing track of the tracking target subject is rescinded (removed, cleared or reset).

In step 303, the defocus amount detected in correspondence to the focus detection area assuming the position of the previous subject area 47 is compared with the defocus amount detected in correspondence to the focus detection area assuming the position of the current subject area 47 and a decision is made as to whether or not the difference between the two defocus amounts is equal to or less than a predetermined threshold value. This threshold value is a reference value based upon which a decision is made as to whether or not the tracking target subject present in the previous subject area matches the subject being tracked in the current subject area.

If the defocus amount difference is judged to be equal to or less than the threshold value and accordingly it is decided that the same tracking target subject as the tracking target subject in the previous subject area has been captured, the operation proceeds to step 304. If the timer 38 has been previously started up, it is stopped and reset at this point. In step 304, the lens drive quantity is determined through arithmetic operation executed based upon the defocus amount having been detected in step 6 (FIG. 7) in correspondence to the current subject area 47, and the lens drive device 30 is controlled accordingly to execute focus adjustment for the photographic lens 15. If, on the other hand, the defocus amount difference is judged to exceed the threshold value and it is thus decided that the subject having been captured most recently does not match the previous subject, the operation proceeds to step 306 after starting up the timer 38. If the timer 38 has already been started up, the operation simply proceeds to step 306.

In step 306, a decision is made as to whether or not a predetermined length of time has been counted on the timer 38 (has elapsed) after the timer 38 was started up. If it is decided that the predetermined length of time has been counted on the timer 38, the operation proceeds to step 307, whereas if it is decided that the predetermined length of time has not been counted yet on the timer, the operation proceeds to step 305. In step 305, focus adjustment control for the photographic lens 15 is banned (prohibited) (AF lock) and then, the operation returns to execute the processing shown in FIG. 7.

If it is decided in step 306 that the predetermined length of time has been counted on the timer 38, the operation proceeds to step 307. In step 307, the timer 38 is reset and focus detection is executed to determine the defocus amount by using a focus detection area used in the previous focus adjustment control processing. In step 308, the lens drive quantity is determined through arithmetic calculation executed based upon the defocus amount having been determined in step 307 and focus adjustment control for the photographic lens 15 is executed by controlling the lens drive circuit 30. Subsequently, the operation returns to execute the processing shown in FIG. 7.

The predetermined length of time described above may be set in advance as the value inherent to the camera or the photographer may be allowed to set the predetermined length of time. For instance, the user may be allowed to set the predetermined length of time via the operation member 28 or the user may be allowed to select a specific setting for the predetermined length of time by using the operation member 28 and a menu screen (brought up on display at a liquid crystal display device (not shown)) in combination. The predetermined length of time may be set by the photographer within a range of, for instance, 0.2 sec~1 sec or it may be selected as a setting inherent to the camera in a range of 0.5 sec~1 sec.

As explained above, if it is decided that the tracking device has lost track of the tracking target subject or if the difference between the defocus amount detected for the previous subject and the defocus amount detected for the current subject is judged to exceed the predetermined threshold value, the focus adjustment control is banned (AF lock) over the specific length of time in the embodiment. Then, after the specific length of time elapses following the focus adjustment control ban (AF lock) the focus adjustment is resumed (the AF lock is cleared) by using the focus detection area used in the previous focus adjustment control processing.

As a result, the tracking processing never completely stops. In addition, even when the tracking processing is briefly disabled when, for instance, the tracking target subject becomes temporarily hidden behind another subject, the tracking target subject is likely to reappear in the vicinity of the point where it becomes hidden. Thus, the tracking processing for the tracking target subject can be resumed promptly with a high level of accuracy.

If it is decided in step 5 in FIG. 7 that the shutter button at the operation member 28 has been pressed all the way down, the operation proceeds to step 9 to execute a sequence of photographing control through which the aperture (not shown) at the exchangeable lens 11 is set, the quick return mirror 13 is made to retreat out of the photographic light path of the exchangeable lens 11, the shutter 14 is controlled to open/close, the electrical charge storage and the charge read at the first image sensor 12 are controlled, the captured image undergoes image processing, the image is recorded and the like. It is to be noted that since the photographing control does not bear direct relevance to the present invention, it is not explained in detail.

As described above, a decision as to whether or not the focus adjustment control for the photographic lens is to be banned is made based upon the defocus amount detected over the focus detection area corresponding to the position assumed by the tracking target subject area searched by using the tracking target subject template image in the embodiment. Thus, even if another object moves across the space in front of the tracking target subject focus adjustment is not executed accidentally for the other object to end up losing track of the tracking target subject, or focus adjustment is not executed on the wrong subject with a hue similar to that of the tracking target subject erroneously recognized as the tracking target subject. As a result, the level of tracking performance with which the target subject is tracked can be improved.

Figure 12A:
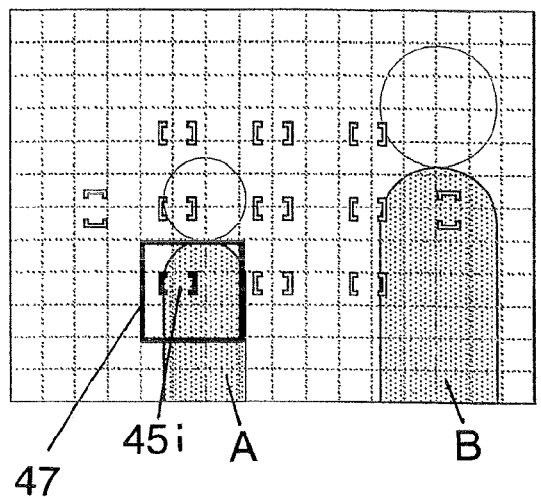
'
FIGS. 12A and 12B illustrate the subject tracking operation executed in the embodiment.
Figure 12B:
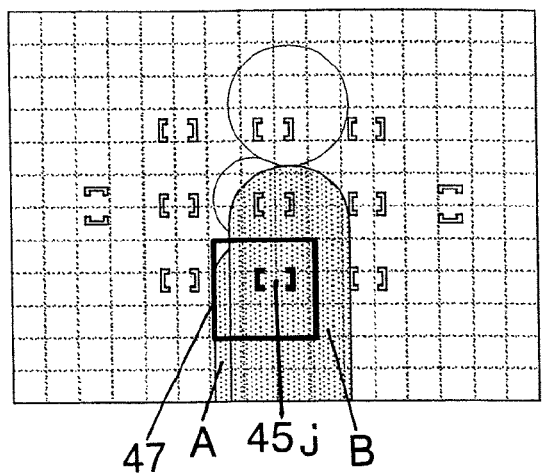

FIGS. 12A and 12B illustrate how the focus adjustment control is executed as described above. It is assumed that FIG. 12A shows a subject A being tracked over the tracking subject area 47. It is also assumed that the subject A is moving to the right in the figure whereas a subject B is moving toward the left in the figure, that the subject A and the subject B are wearing clothes in similar colors and that the subject B is located closer to the camera relative to the subject A. As shown in FIG. 12B, as the subject B moves in front of the subject A, the subject A becomes hidden behind the subject B.

Under these circumstances, the least hue difference may be judged to be equal to or less than the threshold value and the tracking target subject may be erroneously judged to be present in the search area 49 in step 202 in FIG. 9, since the subject B is dressed in clothing similar in color to the clothing worn by the subject A.

In the embodiment, however, the defocus amount detected in correspondence to the focus detection area 41i (see FIG. 12A) assuming the position of the previous subject area 47 is compared with the defocus amount detected in correspondence to the focus detection area 45j (see FIG. 12B) assuming the position of the current subject area 47 and a decision is then made as to whether or not the difference between the two defocus amounts is equal to or less than the predetermined threshold value in step 303 in FIG. 10. Since the defocus amount detected for the previous subject A is clearly different from the defocus amount detected for the current subject B, the operation will proceed to step 306 after making the decision in step 303 in FIG. 10. As the focus adjustment control becomes banned in step 305 subsequently, focus is not erroneously set on the subject B.

In addition, the image information contained in the image plane formed via the photographic lens and the image information corresponding to the template image of the tracking target subject are referenced against each other and a decision as to whether or not the tracking target subject has moved out of the tracking position based upon the referencing results in the embodiment. Thus, the decision as to whether or not the tracking target subject has disappeared can be made with a high level of accuracy.

Furthermore, by adopting the embodiment in which the tracking target subject is searched within the search area set within the image plane formed via the photographic lens for specific purposes of tracking target subject search and the search area is expanded to further search for the tracking target subject if the tracking target subject moves out of the initial search area, the likelihood of recapturing the tracking target subject is raised.

It is to be noted that while the tracking target subject is manually specified by selecting the focus detection area corresponding to the tracking target subject via the focus detection area selector switch in the embodiment described above, the tracking target subject may instead be automatically specified by the control device 29. For instance, a subject captured in a focus detection area with the defocus amount indicating the closest range among the defocus amounts detected in correspondence to the plurality of focus detection areas may be designated as the tracking target subject, or the tracking target subject may be specified by adopting a face recognition technology.

In addition, while the focus adjustment state of the photographic lens 15 is detected by adopting the split-pupil phase difference detection method in the embodiment described above, a focus evaluation value indicating the focus adjustment state of the photographic lens 15 may be detected through a contrast method, instead.

Moreover, while the same color information area is designated as the tracking subject area based upon the color information indicating the color of the subject present in the image area corresponding to the focus detection area specified as the area containing the tracking target subject in the embodiment described above, an area ranging over, for instance, 4×4 pixels, which corresponds to the focus detection area, may be simply designated as the tracking subject area without using color information, so as to simplify the processing. Alternatively, the size of the tracking subject area may be adjusted in correspondence to the image magnification factor set in correspondence to the focal length of the photographic lens, e.g., a greater tracking subject area in correspondence to a smaller focal length at the photographic lens, a smaller tracking subject area set in correspondence to a greater focal length at the photographic lens is large, and the like.

Furthermore, while the tracking subject area is determined based upon the subject color information in the embodiment described above, the tracking subject area may instead be determined based upon information in which the subject brightness (luminance) information is incorporated with the subject color information.

In the embodiment described above, the focus adjustment control is banned (AF lock) over the specific length of time if the tracking device loses track of the subject during the color-based tracking processing, as shown in FIG. 10. However, even when the tracking device loses track of the tracking target subject during the color-based tracking processing, focus adjustment control may still be executed by using the defocus amount detected in correspondence to a specific focus detection area by judging that the tracking target subject has not been lost, as long as the difference between the defocus amount detected over the focus detection area assuming the position of the previous subject area 47 and the defocus amount detected in the specific focus detection area is equal to or less than a predetermined threshold value.

FIG. 13 presents a flowchart of a variation of the focus adjustment control shown in FIG. 10. The same step numbers are assigned to steps in which processing similar to that in FIG. 10 is executed. In step 301 in FIG. 13, a decision is made as to whether or not the "subject lost flag" has been set and if it is decided that the "subject lost flag" has been set, the operation proceeds to step 309. In step 309, the defocus amount in a specific focus detection area is detected and a decision is made as to whether or not the difference between the defocus amount detected over the focus detection area assuming the position of the previous subject area 47 and the defocus amount detected over the specific focus detection area is equal to or less than a predetermined second threshold value. It is desirable to select a value smaller than the threshold value used in step 303 for the second threshold value.

If it is decided in step 309 that the defocus amount difference is equal to or less than the second threshold value, the operation proceeds to step 304. In step 304, a specific lens drive quantity is calculated through arithmetic operation executed based upon the defocus amount detected in correspondence to the specific focus detection area and the lens drive device 30 is controlled accordingly to execute focus adjustment control for the photographic lens 15.

If, on the other hand, it is decided in step 309 that the defocus amount difference is not equal to or less than the second threshold value, the operation proceeds to step 306 after starting up the timer 38 as in the processing shown in FIG. 10. If the timer 38 has already been started up, the operation simply proceeds to step 306. While the processing executed in step 306 and subsequent steps is similar to that shown in FIG. 10, it differs from the processing in FIG. 10 in that the focus detection is executed in step 307 by using the specific focus detection area. In this situation, the template image is not updated.

The processing shown in FIG. 13 is set as a mode in which even if the tracking device loses track of the tracking target subject through color-based tracking processing, a decision is made as to whether or not the tracking target subject has truly disappeared by giving priority to comparison processing executed based upon the defocus amounts.

The specific focus detection area is one of a plurality of focus detection areas set in the photographic plane, for example the focus detection area 45*f* located around the center of the photographic plane, and is a pre-designated priority area, bearing no relevance to the tracking area. It is to be noted that the specific focus detection area may be a focus detection area corresponding to the area with the least difference relative to the template image. In such a case, the focus detection can be executed in step 307 by using the focus detection area corresponding to the area with the value indicating the least difference. Alternatively, the focus detection may be executed by using the focus detection area that was used in the previous focus detection control processing as the specific focus detection area.

If the tracking target subject changes a facing direction to the camera, the ratio of matching with the template image becomes small and it is likely judged that the tracking target subject has become lost. However, since the processing of FIG. 13 is executed by using the focus detection area that was used in the previous focus detection control processing as the specific focus detection area, the tracking device can keep on tracking the tracking target subject by using the specific focus detection area even if it is judged that the tracking target subject has become lost in the color-based tracking processing.

Also, if the threshold value in step 202 is too small, it is likely judged that the tracking target subject has become lost in the color-based tracking processing. However, if the processing of FIG. 13 is executed by using the focus detection area corresponding to the area with the least difference relative to the template image as the specific focus detection area, the tracking device can keep on tracking the tracking target subject by using the specific focus detection area even if it is judged that the tracking target subject has become lost in the color-based tracking processing.

In the embodiment described above, the tracking processing is executed based upon the differences in the hues B/G, R/G, calculated in correspondence to the individual pixels. Alternatively, the tracking processing may be executed by using the brightness (luminance) information instead of the hue information. For instance, the tracking information may be executed by regarding the G value data as the brightness information and thus utilizing the G value data alone. As a further alternative, brightness information obtained by multiplying the R, G and B values by predetermined coefficients and then calculating their sum may be used.

While an explanation is given above in reference to the embodiment on an example in which the present invention is adopted in a single lens reflex digital still camera, the present invention may be adopted in an image-capturing apparatus other than a single lens reflex digital still camera. Namely, the present invention may be adopted to achieve advantages similar to those described above in all types of image-capturing apparatuses capable of obtaining images in time sequence, such as a compact digital camera and a video camera.

The above described embodiment is an example and various modifications can be made without departing from the scope of the invention.

What is claimed is:

1. A tracking device, comprising:
an image sensor that obtains image information of an image present within an image plane formed via an optical system;
a tracking unit that tracks a target within the image plane based upon the image information;
a focus detection unit that detects a focus adjustment state of the optical system over at least one focus detection area set in the image plane;
a control unit that executes focus adjustment control for the optical system based upon the focus adjustment state detected in the focus detection area corresponding to a position of the target; and
a decision-making unit that makes a decision as to whether or not the target is being tracked based upon results of tracking operation executed by the tracking unit,
wherein the control unit bans the focus adjustment control based upon results of the decision made by the decision-making unit.

2. A tracking device according to claim 1, wherein:
a plurality of focus detection areas are set in the image plane; and
the tracking unit calculates a difference quantity indicating a difference between image information in the image plane and image information corresponding to the target and tracks the target based upon the difference quantity.

3. A tracking device according to claim 1, wherein:
a plurality of focus detection areas are set in the image plane; and
the tracking unit calculates a difference quantity indicating a difference between image information in the image plane and image information corresponding to the target and tracks the target by designating an area indicating the smallest difference quantity as an area where the target is located.

4. A tracking device according to claim 1, wherein:
the tracking unit compares image information in the image plane with image information corresponding to the target; and the decision-making unit makes a decision as to whether or not the target is being tracked based upon comparison results.

5. A tracking device according to claim 1, wherein:
the tracking unit compares image information in the image plane with image information corresponding to the target; and the decision-making unit makes a decision as to whether or not the target is being tracked based upon a match rate at which the image information in the image plane and the image information corresponding to the target match.

6. A tracking device according to claim 1, wherein:
the control unit bans the focus adjustment control if the decision-making unit determines that the target is not being tracked.

7. A tracking device according to claim 1, wherein:
the decision-making unit makes a decision as to whether or not to ban the focus adjustment control based upon comparison results obtained by comparing image information in the image plane with image information corresponding to the target and the focus adjustment state detected in the focus detection area corresponding to a position of the target.

8. A tracking device according to claim 1, wherein:
if the target is judged to have been tracked after banning the focus adjustment control, the control unit rescinds a ban of the focus adjustment control.

9. A tracking device according to claim 1, wherein:
if the target is judged to have been tracked after banning the focus adjustment control, the control unit executes focus adjustment control for the optical system based upon the focus adjustment state detected in the focus detection area corresponding to a position of the target after banning the focus adjustment control.

10. A tracking device according to claim 1, wherein:
if the target cannot be tracked continuously over a predetermined length of time after banning the focus adjustment control, the control unit rescinds a ban of the focus adjustment control.

11. A tracking device according to claim 1, wherein:
if a ban of the focus adjustment control is rescinded after banning the focus adjustment control, the control unit executes focus adjustment control for the optical system based upon the focus adjustment state detected in the focus detection area corresponding to a position of the target before the ban of the focus adjustment control was started.

12. A tracking device according to claim 1, wherein:
the tracking unit tracks the target inside a search area set within the image plane; and
the search area can be altered based upon results of the decision made by the decision-making unit.

13. A tracking device according to claim 1, wherein:
the tracking unit tracks the target in a search area set within the image plane; and
if a position of the target is outside the search area, the tracking unit tracks the target by expanding the search area.

14. A tracking device according to claim 1, wherein:
the tracking unit tracks the target inside a search area set within the image plane; and
if a position of the target is outside the search area, a direction along which the subject is likely to move within the image plane is estimated and the search area is changed by the estimated moving direction.

15. A tracking device according to claim 1, wherein:
the image information indicates color or brightness of the target.

16. An image-capturing apparatus comprising:
a tracking device according to claim 1.

17. An image-capturing apparatus according to claim 16, wherein:
the image sensor includes a first image sensor used to obtain image information and record the image within the image plane and a second image sensor that obtains image information used by the tracking unit when tracking the target.

18. A tracking method, comprising:
obtaining image information of an image within an image plane formed via an optical system;
tracking a target within the image plane based upon the image information;
detecting a focus adjustment state of the optical system in correspondence to at least one focus adjustment area set within the image plane;
executing focus adjustment control for the optical system by using the focus adjustment state detected in the focus detection area corresponding to a position of the target;
making a decision as to whether or not results of tracking operation for the target have met a predetermined condition; and
controlling the focus adjustment control based upon results of the decision.

19. A tracking method according to claim 18, further comprising:
comparing image information in the image plane with image information corresponding to the target,
wherein the decision as to whether or not the results of tracking operation for the target have met the predetermined condition is made based upon comparison results.

20. A tracking method according to claim 18, further comprising:
comparing image information in the image plane and image information corresponding to the target,
wherein the decision as to whether or not the results of tracking operation for the target have met the predetermined condition is made based upon a match rate at which the image information in the image plane and the image information corresponding to the target match.

21. A tracking method according to claim 18, further comprising:
making a decision as to whether or not to control the focus adjustment control based upon comparison results obtained by comparing image information in the image plane and image information corresponding to the target and the focus adjustment state detected in the focus detection area corresponding to a position of the target.

22. A tracking device, comprising:
an image sensor that obtains image information of an image present within an image plane formed via an optical system;
a tracking unit that tracks a target within the image plane based upon the image information;
a focus detection unit that detects a focus adjustment state of the optical system over at least one focus detection area set in the image plane;
a control unit that executes focus adjustment control for the optical system by using the focus adjustment state detected in the focus detection area corresponding to a position of the target; and
a decision-making unit that makes a decision as to whether or not results of tracking operation executed by the tracking unit have met a predetermined condition,
wherein the control unit controls the focus adjustment control based upon results of the decision made by the decision-making unit.

23. A tracking device according to claim 22, wherein:
the decision-making unit makes a decision as to whether or not to control the focus adjustment control based upon comparison results obtained by comparing image information in the image plane with image information corresponding to the target and the focus adjustment state detected in the focus detection area corresponding to a position of the target.

24. A tracking device according to claim 22, wherein:
if the target is judged to have been tracked after controlling the focus adjustment control, the control unit rescinds controlling of the focus adjustment control.

25. A tracking device according to claim 22, wherein:
the decision-making unit includes a first decision-making unit that makes a decision as to whether or not the target within the image plane has been tracked based upon the image information by the tracking unit, and a second decision-making unit that makes a decision as to whether or not the target has been tracked based upon the focus adjustment state detected in the focus detection area corresponding to a position of results of tracking operation executed by the tracking unit after the decision by the first decision-making unit; and
the control unit executes the focus adjustment control if the second decision-making unit determines that the target has been tracked and controls the focus adjustment control if the second decision-making unit determines that the target has not been tracked.

26. A tracking device according to claim 22, wherein:
the decision-making unit includes a first decision-making unit that detects a difference between a previous focus adjustment state and a current focus adjustment state in the focus detection area corresponding to the position of the target based upon the focus adjustment state detected by the focus detection unit, and a second decision-making unit that makes a decision as to whether or not the target has been tracked based upon the results of tracking operation by the tracking unit; and
the control unit controls the focus adjustment control if the second decision-making unit determines that the target has not been tracked and the first decision-making unit determines that the difference between the previous focus adjustment state and the current focus adjustment state is bigger than a first predetermined value.

27. A tracking device according to claim 26, wherein:
the control unit executes the focus adjustment control if the second decision-making unit determines that the target has not been tracked and the first decision-making unit determines that the difference between the previous focus adjustment state and the current focus adjustment state is smaller than a second predetermined value which is smaller than the first predetermined value.

28. A tracking device according to claim 22, wherein:
the decision-making unit includes a first decision-making unit that makes a decision as to whether or not the target has been tracked by using the image information, and a second decision-making unit that makes a decision as to whether or not a difference between a previous focus adjustment state and a current focus adjustment state is bigger than a predetermined value by using an output from the focus detection unit.

29. A tracking device according to claim 28, wherein:
the control unit does not control the focus adjustment control if the first decision-making unit does not determine that the target has been tracked and the second decision-making unit determines that the difference is smaller than the predetermined value.

30. A tracking device according to claim 28, wherein:
the control unit does not control the focus adjustment control if the first decision-making unit determines that the target has been tracked and the second decision-making unit determines that the difference is smaller than the predetermined value.

31. A tracking device according to claim 28, wherein:
the control unit executes the focus adjustment control by using a focus detection area used in a previous focus adjustment control processing if the first decision-making unit does not determine that the target has been tracked.

32. A tracking device according to claim 28, wherein:
if the first decision-making unit does not determine that the target has been tracked, the control unit bans the focus adjustment control for a predetermined length of time and executes the focus adjustment control by using a focus detection area used in a previous focus adjustment control processing after the predetermined length of time.

* * * * *